United States Patent [19]

Okuda et al.

[11] Patent Number: 5,534,091

[45] Date of Patent: Jul. 9, 1996

[54] JOINING METHOD OF CERAMICS AND INSERTION MEMBER FOR HEATING AND JOINING FOR USE IN THE METHOD

[75] Inventors: Kouji Okuda, Kobe; Tokumitsu Nishi, Osaka; Hiroshi Takai, Nishinomiya; Hisakiyo Hoshino, Settsu, all of Japan

[73] Assignee: Daihen Corporation, Osaka, Japan

[21] Appl. No.: 281,861

[22] Filed: Jul. 28, 1994

Related U.S. Application Data

[63] Continuation of Ser. No. 940,901, filed as PCT/JP92/00185, Feb. 21, 1992 published as WO92/14686, Sep. 3, 1992, abandoned.

[30] Foreign Application Priority Data

Feb. 26, 1991 [JP] Japan .................................. 3-56140

[51] Int. Cl.⁶ ......................................... B32B 31/00
[52] U.S. Cl. ..................... 156/89; 156/272.2; 156/379.6; 219/600
[58] Field of Search .............................. 156/274.2, 272.2, 156/273.7, 379.6, 380.3, 380.4, 273.9, 272.4, 89; 219/600

[56] References Cited

U.S. PATENT DOCUMENTS

| | | | |
|---|---|---|---|
| 3,949,062 | 4/1976 | Vereschagin et al. | 423/446 |
| 4,066,427 | 1/1978 | Goto . | |
| 4,420,352 | 12/1983 | Schroeder | 156/89 |
| 4,510,005 | 4/1985 | Nijman | 156/221 |
| 4,542,073 | 9/1985 | Tanaka et al. | 428/446 |
| 4,724,020 | 2/1988 | Ebath | 156/272.2 |
| 5,045,137 | 9/1991 | Gyarmati | 156/89 |
| 5,154,785 | 10/1992 | Tabata | 156/185 |
| 5,244,876 | 9/1993 | Preisler et al. | 505/1 |

FOREIGN PATENT DOCUMENTS

| | | |
|---|---|---|
| 61-036180A | of 0000 | Japan . |
| 61-40874 | 2/1986 | Japan . |
| 62-187180 | 8/1987 | Japan . |
| 63-162585 | 7/1988 | Japan . |
| 403263807A | 11/1991 | Japan ................... 29/25.03 |

OTHER PUBLICATIONS

Ebata et al. Electrical Joining of SiC Ceramics 1989 pp. 83–85 Journal Ceramic Soc Japan vol. 97 83.

*Primary Examiner*—Chester T. Barry
*Attorney, Agent, or Firm*—Scully, Scott, Murphy & Presser

[57] ABSTRACT

The present invention related to a method for joining ceramic members and an insertion member to be employed in the joining method. In the present invention, ceramic members are heated by the induction heating in a state that a heating ceramic member having a conductivity larger than those of the ceramic members to be jointed is intervened between the ceramic members to be jointed. In this induction heating, the heating ceramic member having a larger conductivity is mainly heated and the temperature of the butting portion is raised up to a temperature needed to join the ceramic members. Upon joining the ceramic members, it is desirable to press the butting portion but is not necessarily needed. In the case without the pressing, it is desirable to form a layer of a joining agent on each of the butting surfaces of the heating insertion member beforehand.

3 Claims, 3 Drawing Sheets

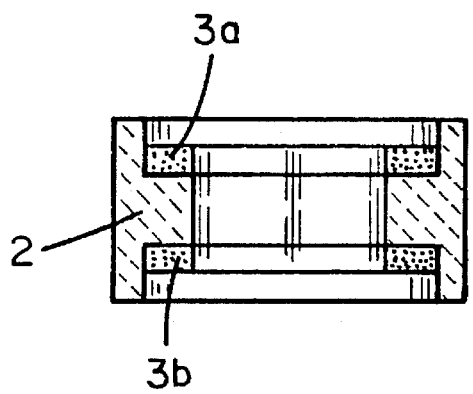
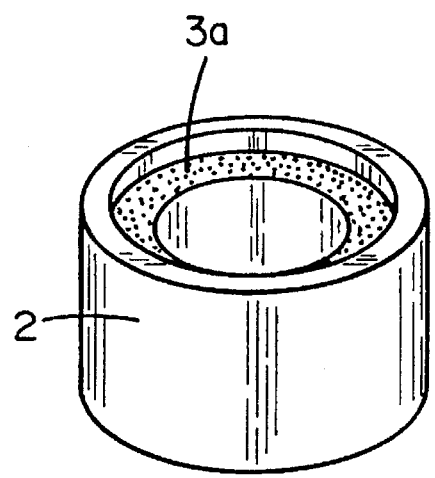
FIG.5(A)        FIG.5(B)
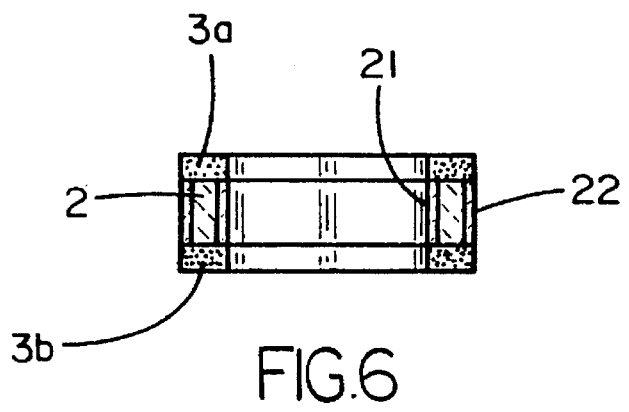
FIG.6

JOINING METHOD OF CERAMICS AND INSERTION MEMBER FOR HEATING AND JOINING FOR USE IN THE METHOD

This is a continuation of application(s) Ser. No. 07/940, 901, filed as PCT/JP92/00185, Feb. 21, 1992 published as WO92/14686, sep. 3, 1992, now abandoned corresponding to International Application PCT/JP92/00185 filed on Feb. 21, 1992 and which designated the U.S.

BACKGROUND OF THE INVENTION

1. Field of the Invention

The present invention relates to a method for joining ceramic members with small electric conductivity using induction heating of the butting parts, and an insertion member to be employed in the joining method.

2. Description of the Prior Art

When ceramic members are to be jointed with each other or a ceramic member is to be jointed with a metallic member through induction heating, e.g., high frequency heating, a suitable joining agent is intervened between the members, and electricity is supplied to an induction heating coil cylindrically wound in the outer periphery of the butted portion of the members. In this case, if the ceramic members or metallic member have large electric conductivity, an induction current naturally flows in the ceramic members or metallic member, thereby heating the butted portion and joining the ceramics. On the other hand, when the ceramic members or metallic member become electrically conductive at high temperatures, after the surface of the butted portion of the members is coated with a conductive material such as metal or the like, this coating is heated with an induction current. The induction current comes to flow in the ceramic members the conductivity of which is enhanced through induction heating. In consequence, the butted portion is heated and the ceramic members are bonded. The joining method of the ceramic members as above is proposed in Japanese Patent Laid-open Tokkaisho 61-36180. Meanwhile, when insulating ceramic members are to be jointed with each other, it may be possible to insert a conductive joining agent between the members and heat the joining agent with an induction current.

The prior art of these kinds is, however, not applicable to joining of ceramic members such as $Si_3N_4$, $Al_2O_3$, etc. with use of an insulating joining agent which are insulating at high temperatures. Moreover, when the ceramic members having conductive properties at high temperatures, e.g., $ZrO_2$ or the like, are to be jointed with each other or when a conductive joining agent is used for bonding, although coating of the conductive material is considered, it is difficult to effectively heat the members to high temperatures since the coating is generally considerably thinner in comparison with the members to be jointed of a huge volume. In other words, it takes a long joining time and requires a large quantity of electricity in the prior art. Further, joining is restricted only to small-size members.

SUMMARY OF THE INVENTION

The object of the present invention is therefore to provide an improved joining method of ceramics and an insertion member for the convenience of joining in the joining method, with a view to substantially solving the above-described disadvantages in the prior art.

In order to achieve the aforementioned object, the present invention features in claim 1 that ceramic members to be jointed are brought to butt against each other with a heating ceramics a part of which or the whole of which has larger electric conductivity than the ceramic members to be jointed intervened therebetween, thereby constituting an assembled body. The body is pressured in the butting direction. When an electric current supplying to an induction heating coil provided in the vicinity of the butting part, mainly the heating ceramics, is heated by the induction current, the butted portion is heated to a joining temperature for joining the ceramic members through induction heating.

According to a still aspect in claim 2, ceramic members to be jointed are brought to butt against each other with a heating ceramics, a part of which or the whole of which has larger electric conductivity than the ceramic members to be jointed, intervened therebetween via joining agents, thereby constituting an assembled body. When an electric current supplying to an induction heating coil provided in the vicinity of the butting part, mainly the heating ceramics or, heating ceramics and joining agents are heated by the induction current, so that the butted portion is heated to a joining temperature for joining the ceramic members through induction heating.

According to a further aspect in claim 3, a part or the whole of the assembled body is heated to lower temperatures than the joining temperature by an auxiliary heating means from before the main heating with the induction current is started to after it is finished.

According to a still further aspect in claim 4, a heating insertion member for joining is interposed between the ceramic members to be jointed to form a layer of the joining agent at the butting surfaces of the heating ceramics, thereby uniting the ceramic members to be jointed with the heating ceramics.

In the joining method as above and by using the heating insertion member for joining as above, since the heating ceramics between the ceramics to be jointed is mainly heated by the induction current, the butted portion can be heated intensively. Accordingly, the present invention is effective when the ceramics having small electric conductivity, particularly, insulating ceramics are to be jointed each other. More specifically, according to claim 1, ceramic members with small electric conductivity, particularly, insulating ceramic members are partially heated through high frequency heating. Therefore, the heating efficiency is improved and the joining time is greatly shortened, thereby realizing joining at low costs. The joining method is utilizable also in joining of large-size members.

In addition to the advantage of claim 1, according to claim 2, the present invention enables joining with low pressure at low temperatures as the joining agent is interposed. Therefore, the joining method becomes simple. The joining method of claim 3 presents not only the advantages claimed in claims 1, 2 above, but a characteristic feature that in the case where the ceramic members to be jointed are weak to the thermal shock or when short-time and high-temperature joining is required, the breakage of the ceramic members is prevented.

An effect of claim 4 is to make handling and positioning of the ceramic members at the joining time easy, the joining process simplified and operation at the joining spot easy.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIGS. 5(A) and 5(B) are a schematic cross sectional view and a perspective view of a heating insertion member for joining according to an ninth embodiment of the present invention; and FIG. 6 is a schematic cross sectional view of a heating insertion member for joining according to a tenth embodiment of the present invention.

DETAILED DESCRIPTION OF THE PREFERRED EMBODIMENTS

Preferred embodiments of the present invention will be discussed in detail hereinbelow with reference to the accompanying drawings thereof.

[Embodiment 1]

Figure 1:
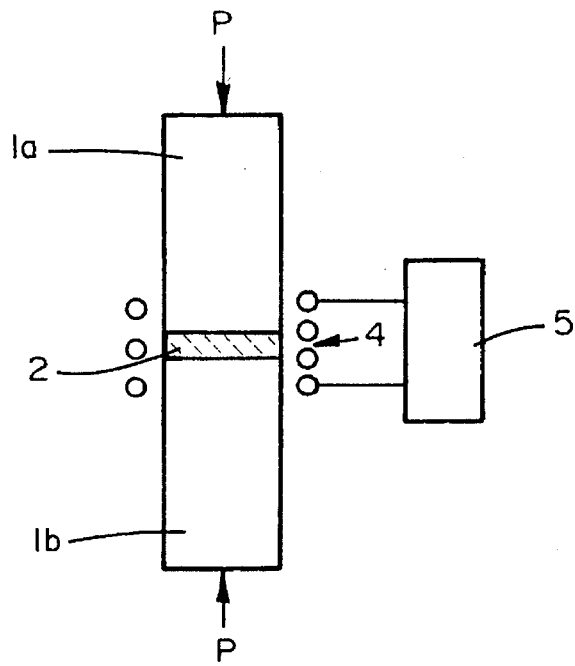
FIG. 1 is a schematic structural diagram of a joining method according to a first embodiment of the present invention.

In FIG. 1 schematically showing the structure of a joining method according to a first embodiment of the present invention, ceramic members of low electric conductivity are jointed to each other without using a joining agent. First, a ring of SiC ceramics 2 ($\phi12\times\phi5\times5$) having the electric conductivity of approximately $10^2$ $[\Omega.cm]^{-1}$ is placed between circular pipes of SiC ceramics to be jointed 1a and 1b ($\phi12\times5\times50$) each having the electric conductivity of $10^{-2}$ $[\Omega.cm]^{-1}$. At this time, the butting surfaces of the members to be jointed and the ceramics for heating are mirror-polished beforehand. A pressure P of approximately 100 MPa is impressed to the assembled body in the butting direction by a pressuring device (not shown). Moreover, a water cooled coil 4 of a suitable length for induction heating is wound in the outer periphery of the butted portion so as to mainly heat the butting part, and a high frequency electric power source equipment 5 is connected to both ends of the coil 4.

In the aforementioned structure, while the joining ambience is made vacuum, a high frequency current of 50 KHz is fed to the coil 4 by the high frequency electric power source equipment 5 to heat the heating ceramics 2 through induction heating. As the temperature of the members to be jointed 1a, 1b is raised because of the thermal conduction, the resistance of each member is decreased, thereby allowing an induction current to also flow in this part. Consequently, the whole butted portion is heated. Since the heating ceramics 2 generates heat most, the butted portion is mainly and effectively heated. The supplied electric power is automatically adjusted by a signal from a radiation thermometer so that the temperature of the butted portion is raised to about 1900° C. After the butted portion is held at about 1900° C. for one hour, it is cooled to room temperatures, when joining is completed. When the hermetic property of the jointed body is evaluated by an He leak detector, it shows a high value not larger than a detecting limit. At the same time, when the jointed part is cut and the microstructure is inspected, it is found that the ceramics are jointed well.

[Embodiment 2]

Figure 2:
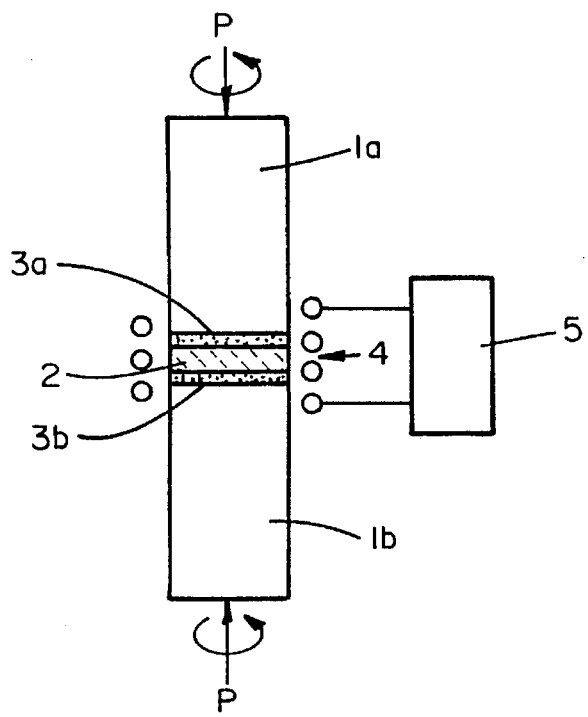
FIG. 2 is a schematic structural diagram of a joining method according to a second through a fifth embodiments of the present invention.

FIG. 2 schematically shows the structure of a joining method according to a second embodiment, in which insulating ceramics are jointed each other with use of a conductive joining agent. A ring-shaped $Si_3N_4$ ceramics for heating 2 including TiN ($\phi20\times\phi5\times5$) having the electric conductivity of approximately $10^2$ $[\Omega.cm]^{-1}$ is inserted between circular pipes of $Si_3N_4$ ceramics to be jointed 1a, 1b ($\phi20\times\phi15\times100$) each having the electric conductivity of not larger than $10^{-13}$ $[\Omega.cm]^{-1}$. Joining agents 3a, 3b (200 μm) of active brazing metal including Ti wax are provided between the ceramics to be jointed 1a, 1b and heating ceramics 2. In the same manner as in Embodiment 1, the assembled body is pressured and fixed with a suitable pressure P from a pressuring device (not shown) in the butting direction. An induction heating coil 4 is arranged in the outer periphery of the butting part, and a high frequency electric power source equipment 5 is connected to both ends of the coil 4.

While the joining ambience is rendered vacuum, a high frequency current of 50 KHz is added to the coil 4 from the high frequency electric power source equipment 5 as the assembled body is turned around the central axis. Accordingly, the heating ceramics 2 and joining agents 3a, 3b are heated by the induction current, and the butted portion and the vicinity of the butted portion are heated by the heat resulting from the induction heating. The supplied electric power is adjusted by monitoring the temperature of the butted portion by a radiation thermometer to be about 900° C. The butted portion is kept at a temperature about 900° C. for five minutes and then cooled to room temperatures. Joining is completed in this manner. The hermetic property of the jointed body is evaluated by means of an He leak detector and found high not larger than a detecting limit. When the jointed part is cut to monitor the microstructure, a uniform jointed layer of about 15 μm thickness is detected. Accordingly, joining is judged to be performed well.

[Embodiment 3]

A third embodiment of the present invention will be understood from the schematic structural diagram of the second embodiment (referring to FIG. 2). Insulating ceramics are jointed together with use of an insulating joining agent according to the third embodiment.

A ring-shaped $Al_2O_3$ ceramics for heating 2 ($\phi20\times\phi15\times5$) having the electric conductivity of approximately $10^2$ $[\Omega.cm]^{-1}$ including TiN is inserted between circular pipes of $Al_2O_3$ ceramics to be jointed 1a, 1b ($\phi20\times15\times100$) having the electric conductivity of not larger than $10^{-13}$ $[\Omega.cm]^{-1}$. Joining agents 3a, 3b (400 μm) of oxide solder including $B_2O_3$ are provided between the ceramics to be jointed 1a, 1b and heating ceramics 2, respectively, and then a suitable pressure P is added to fix the assembled body. An induction heating coil 4 and a high frequency electric power source equipment 5 are the same as used in Embodiment 1.

The joining ambience is atmospheric. While the assembled body is turned around the central axis, a high frequency current of 50 KHz is supplied to the coil 4 from the high frequency electric power source equipment 5, thereby heating the heating ceramics 2 through induction heating. Accordingly, the butted portion and the vicinity thereof are heated by the heat generated by the induction heating. The supplied electric power is automatically adjusted by a signal from a radiation thermometer to raise the temperature of the butted portion to about 750° C. After the butted portion is maintained at about 750° C. for five minutes, the assembled body is cooled to room temperatures, thus completing bonding. The evaluating result of the jointed body in the same manner as in the foregoing embodiments confirms good bonding.

[Embodiment 4]

A fourth embodiment of the present invention will be understood from the schematic structural diagram of the second embodiment (referring to FIG. 2), wherein ceramics of low electric conductivity are to be jointed with use of a conductive joining agent.

A highly conductive ring-shaped SiC ceramics for heating 2 ($\phi 20 \times \phi 15 \times 5$) having the electric conductivity of approximately $10^2$ $[\Omega.\text{cm}]^{-1}$ is inserted between low conductive circular SiC pipes to be jointed 1a, 1b ($\phi 20 \times \phi 15 \times 100$) having the electric conductivity of about $10^{-2}$ $[\Omega.\text{cm}]^{-1}$. Joining agents 3a, 3b (200 μm) of active brazing metal including Ti are provided between the ceramics to be jointed 1a, 1b and heating ceramics 2, respectively, and then a suitable pressure P is added to fix the assembled body. An induction heating coil 4 and a high frequency electric power source equipment 5 are the same as in the first embodiment.

In the above-described structure, while the joining ambience is made vacuum, as the assembled body is turned around the central axis, a high frequency current of 50 KHz is fed to the coil 4 by the high frequency electric power source equipment 5 to heat the heating ceramics 2 and joining agents 3a, 3b through induction heating. As the temperature of the members to be jointed 1a, 1b is raised because of the thermal conduction, the resistance of each member is decreased, thereby allowing an induction current to also flow in this part. Consequently, the whole of the butted portion is heated. In this case, since the heating ceramics 2 and joining agents 3a, 3b generate heat most, the butted portion is mainly and effectively heated. The supplied electric power is adjusted by monitoring the signal from a radiation thermometer so that the temperature of the butted portion becomes about 900° C. After the butted portion is maintained at about 900° C. for five minutes, it is cooled to room temperatures, and joining is completed. When the hermetic property of the jointed body is evaluated by an He leak detector, it shows a high value not larger than a detecting limit. At the same time, when the jointed part is cut and the microstructure is inspected, a uniform jointed layer of about 15 μm thickness is found, and therefore the ceramics are jointed well.

The electric conductivity of the SiC ceramics is greatly changed depending on the raw material, impurities, sintering conditions, microstructures, etc. Commercially available SiC ceramics have an electric conductivity ranging from $10^2$ $[\Omega.\text{cm}]^{-1}$ to $10^{-13}$ $[\Omega.\text{cm}]^{-1}$. Moreover, the temperature characteristic of the SiC ceramics varies. Although the conductivity of the conductivity of the SiC ceramics is initially increased as the temperature is raised, it is inversely decreased afterwards among some SiC ceramics. It is needless to say, however, that the joining method of the present invention is applicable to ceramics of various kinds of conductivity characteristic.

[Embodiment 5]

A fifth embodiment of the present invention will be explained with reference to the schematic structural diagram of the second embodiment (referring to FIG. 2), in which low conductive ceramics are jointed with use of an insulating joining agent.

A highly conductive ring-shaped SiC ceramics for heating 2 ($\phi 20 \times \phi 15 \times 5$) having the electrical conductivity of approximately $10^2$ $[\Omega.\text{cm}]^{-1}$ is inserted between low conductive circular SiC pipes to be jointed 1a, 1b ($\phi 20 \times \phi 15 \times 100$) having the electrical conductivity of about $10^{-2}$ $[\Omega.\text{cm}]^{-1}$. Joining agents 3a, 3b (400 μm) including $CaF_2$ are provided between the ceramics to be jointed 1a, 1b and heating ceramics 2, respectively, and then a suitable pressure P is added to fix the assembled body. An induction heating coil 4 and a high frequency electric power source equipment 5 are the same as in the first embodiment.

In the above-described structure, while the joining ambience is the atmospheric air and the assembled body is turned around the central axis, a high frequency current of 50 KHz is fed to the coil 4 by the high frequency electric power source equipment 5 to heat the heating ceramics 2 through induction heating. As the temperature of the members to be jointed 1a, 1b is raised because of the thermal conduction from the heating ceramics 2, the resistance of each member is decreased, thereby allowing an induction current to flow also in this part. Consequently, the whole of the butted portion is heated. In this case, since the heating ceramics 2 generates heat most, the butted portion is mainly and effectively heated. The supplied electric power is automatically adjusted by a signal from a radiation thermometer so that the temperature of the butted portion becomes about 1500° C. After the butted portion is maintained at a temperature of about 1500° C. for ten minutes, it is cooled to room temperatures, when joining is completed. When the jointed body is evaluated in the same manner as in the above embodiments, it shows that good joining is achieved.

[Embodiment 6]

Figure 3:
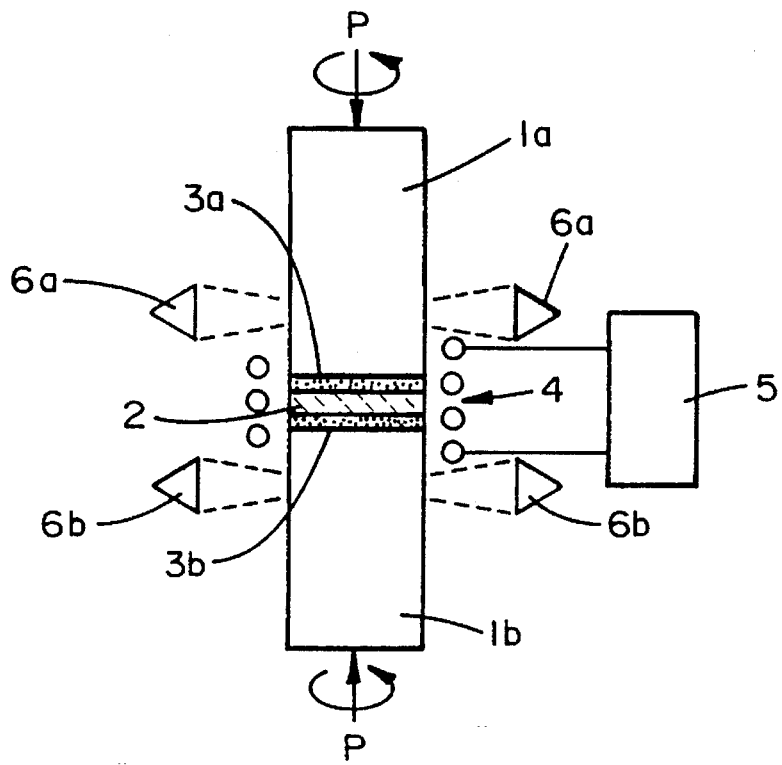
FIG. 3 is a schematic structural diagram of a joining method according to a sixth and a seventh embodiments of the present invention.

FIG. 3 schematically illustrates a structural diagram of a joining method of a sixth embodiment of the present invention. According to the sixth embodiment, an auxiliary heating means is also used for bonding. The auxiliary heating means is employed based on the fact that, according to the joining method of the foregoing embodiment alone, the ceramic members to be jointed and/or heating ceramics are apt to be broken by the thermal stresses caused during joining in the case that the joining temperature should be heightened to enhance the heat proof properties of the jointed portion, or the joining time should be extremely shortened to increase the productivity or to minimize degradation of the jointed portion, for materials having a small conductivity at room temperatures and therefore barely able to expect high frequency induction heating. As the vicinity of the butted portion or the whole of the assembled body is preheated to some temperatures beforehand by the auxiliary heating means, the heat temperature gradient is turned moderate when the assembled body, mainly the heating ceramics is quickly heated to the joining temperature through high frequency heating, thereby avoiding breakage of the ceramic members from thermal shock.

A highly conductive, ring-shaped, sintered SiC ceramics for heating 2 ($\phi 20 \times \phi 15 \times 5$) wherein Si is impregnated and having the electrical conductivity of approximately $10^2$ $[\Omega.\text{cm}]^{-1}$ is inserted between low conductive porous circular SiC pipes to be jointed 1a, 1b ($\phi 20 \times \phi 15 \times 100$) having the electrical conductivity of $10^0$ $[\Omega.\text{cm}]^{-1}$. Joining agents of Silicon based brazing alloy 3a, 3b (200 μm) are provided between the ceramic members 1a, 1b and heating ceramics 2, respectively, and then a suitable pressure P is added to fix the assembled body. An induction heating coil 4 and a high frequency electric power source equipment 5 are the same as in the first embodiment.

According to Embodiment 6, two pairs of auxiliary heating means, namely, lamp heating means 6a, 6a and 6b, 6b are provided for preheating to some temperatures before induction heating of the butted portion is started.

In the structure as above, while the joining ambience is Ar gas, as the assembled body is turned around the central axis, the ceramic members 1a, 1b in the vicinity of the induction heating coil 4 are preheated to about 1000° C. by the auxiliary heating means 6a, 6b. Thereafter, the heating ceramics and joining agents are allowed to generate heat through induction heating for one minute or so. As a result, the whole of the butted portion is heated to about 1450° C., thereby reacting the joining agents with the ceramic members and heating ceramics. The body is cooled to room temperatures, thus completing bonding. When the jointed body is cut and the microstructure of the jointed part is monitored, there is found a uniform jointed layer of about 30 µm thickness, i.e., favorable joining is confirmed. For comparison, it is tried to joint the ceramics only by high frequency induction heating without performing preheating by the auxiliary heating means. The ceramic members to be jointed crack and are broken at the point of the crack when heated.

[Embodiment 7]

A seventh embodiment of the present invention is shown in the schematic structural diagram of Embodiment 6 (with reference to FIG. 3), that is, Embodiment 7 is a modified example of Embodiment 6 in which joining with use of the auxiliary heating means is also carried out.

A highly conductive, ring-shaped, sintered SiC ceramics for heating 2 ($\phi 20 \times \phi 15 \times 5$) wherein Si is impregnated and having the electrical conductivity of approximately $10^2$ $[\Omega.cm]^{-1}$ is inserted between low conductive porous circular SiC pipes to be jointed 1a, 1b ($\phi 20 \times \phi 15 \times 100$) having the electrical conductivity of $10^0$ $[\Omega.cm]^{-1}$. Joining agents of SiC/c/ organic binder 3a, 3b (100 µm) are provided between the ceramics to be jointed 1a, 1b and heating ceramics 2, respectively, and then a suitable pressure P is added to fix the assembled body. An induction heating coil 4 and a high frequency power source equipment 5 are the same as in the first embodiment and the auxiliary heating means 6a, 6a and 6b, 6b are the same as in the sixth embodiment.

In the above structure, while the joining ambience is Ar gas, as the assembled body is turned around the central axis, the ceramic members to be jointed 1a, 1b in the vicinity of the induction heating coil 4 are preheated to about 1000° C. by the auxiliary heating means 6a, 6b. Thereafter, the heating ceramics and joining agents are allowed to generate heat through induction heating for one minute or so. Accordingly, the whole of the butted portion is heated to about 1500° C., thereby reacting Si in the heating ceramics with carbon in the joining agents. As a result, the elements of Si and C are turned to SiC, so that the ceramic members are jointed to the heating ceramics. Then, the assembled body is cooled to room temperatures, thus completing bonding. When the jointed body is cut and the microstructure of the jointed part is monitored, there is found a uniform jointed layer of about 100 µm thickness, i.e., favorable joining is confirmed.

Although lamp heating means are used as the auxiliary heating means according to Embodiments 6 and 7, other kinds of heating means or methods, for example, general heating by electric resistance, indirect high frequency induction heating, heating by gas flame or laser, may be utilized. As the auxiliary heating temperature is higher, the thermal shock during high frequency heating in the post-treatment is restricted more effectively. However, the above auxiliary heating means performs heating from the surface of the ceramic members, that is, performs indirect heating and the energy efficiency in heating is poor. Therefore, it is desirable to restrict heating to a minimum depending on the size, shape, joining temperature, and resistances to thermal shock of the members to be jointed so as to prevent adverse influences of the thermal shock. Moreover, although it is permitted to heat the whole of the members to be jointed, it is preferable from the object of the present invention (bonding through local heating) to carry out auxiliary heating only to the vicinity of the butted portion to assume such a temperature distribution as can avoid the adverse influences of the thermal shock. The method of Embodiments 6 and 7 is applicable to the assembled body of Embodiments 1–5.

In the foregoing Embodiments 1–7, insulating ceramics (e.g., AlN, SIALON, mullite and the like) or low electroconductive ceramics (e.g., $ZrO_2$, low conductive composite ceramics, etc.) except for $Si_3N_4$, $Al_2O_3$ and SiC may be used as ceramic members to be jointed 1a, 1b. Moreover, not only the same kinds of ceramics, but different kinds of ceramics can be jointed with each other in the foregoing embodiments.

For the heating ceramics 2, carbide such as SiC, WC or the like, nitride such as TiN, TaN or the like, oxide such as $ZrO_2$, $LaCrO_2$ or the like, silicide such as $MoSi_2$, MoSi or the like, boride such as $TiB_2$ or the like, composite ceramics such as $Si_3N_4$ or SIALON or the like including conductivity dative substance like TiN, SiC, etc., Cermet composed of ceramics and metal, that is to say, all kinds of electroconductive ceramics may be employed. However, it is desirable to select such one that has thermal properties and characteristics close to those of the members to be jointed so as to obtain performance equivalent to that of the members to be jointed. Further, the thickness of the heating ceramics should be set with taking consideration into the thermal properties such as thermal capacity, and thermal conductivity of the members to be jointed, or joining temperature or the like. In order to lessen influences of the residual stress generated at room temperatures due to the temperature distribution at the joining time, such material that assumes suitable linear expansion coefficient and thickness to render the residual stress minimum should be selected in accordance with the temperature distribution at the joining time and the linear expansion coefficient of the joining agents. Further, insulating ceramics may be provided at a part of the periphery of the electroconductive ceramics requiring electrical insulation characteristics if the surface of the jointed part is necessary to be electrically insulating.

According to the direct joining method without using a joining agent as in Embodiment 1, the joining performance is ideal since the jointed part is formed equivalent to the members to be jointed, but the method requires high temperatures and high pressure. Therefore, the joining method in Embodiment 1 cannot be said to be simple and a method using a joining agent is therefore a simpler one. The joining agent may be a metallic joining agent such as active metal brazing alloy or rare metal used in Embodiments 2, 4 and 6 or, inorganic joining agent composed of oxide or fluoride as in Embodiments 3, 5. The most suitable one should be selected from the viewpoint of the reactivity and required properties (for example, inorganic joining agent has superior heat proof properties, corrosion resistances, etc.). When an insulating joining agent among the inorganic joining agents is employed, heat is generated only in the heating ceramics. The present invention can be applied also to the reacting/ sintering method as in Embodiment 7 or such a method without melting a joining agent as a solid state dispersion method, besides the above reacting method whereby the joining agent is melted to react with the ceramic members. The method melting the joining agent is simplest and easy to realize hermetic properties, but generally low in heat proof properties. In contrast, the other methods achieve joining with heat proof properties and high strength, but are less convenient since high temperatures and high pressures are required. Therefore, it is necessary to select the joining agent in accordance with the desired performance or characteristics.

The size, shape of the induction heating coil and the frequency of the power source equipment should be determined from the shape, size, such electrical properties as an electrical conductivity and the like of the heating ceramics. Although the induction heating coil is generally placed outside the pipe-like members to be jointed, it may be arranged inside, i.e., in the inner periphery thereof. However, it should be avoided that the coil is in touch with the conductive part of the to-be-bonded body to be jointed. Moreover, the frequency of the supplied current is not restricted to 50 KHz, but is possible in the range from 300 Hz to 500 KHz.

The reason why the assembled body is turned is to make uniform the temperature in the circumferential direction of the butting part. If each part of the heating ceramics, etc. is electrically uniform in the circumferential direction and moreover the positional relation between the ceramics and coil is correctly controlled, or when the temperature distribution does not matter so much, the body may be jointed in the stationary state.

The heating/cooling speed should be set so that the ceramics is not broken from the thermal shock.

It is necessary to select the joining ambience so as not to damage the function of the joining agent, members to be jointed and heating ceramics. For adjusting the ambience, after the whole of the assembled body or only the vicinity of the butting part, and the coil are placed in a chamber, the chamber is subjected to vacuum exchange or gas flow. In another method, a heat proof and insulating tubular reaction pipe is provided between the coil and assembled body in a manner to cover the whole of the assembled body or only the vicinity of the butted portion and then the reaction tube is processed through vacuum exchange or gas flow. Or gas may be blown to the butting part.

[Embodiment 8]

Figure 4A:
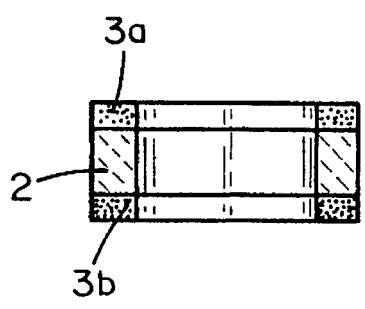
FIGS. 4(A) and 4(B) are a schematic cross sectional view and a perspective view of a heating insertion member for joining according to an eighth embodiment of the present invention.
Figure 4B:
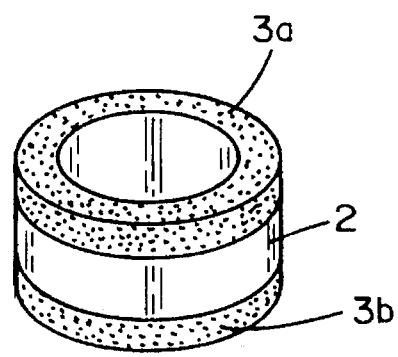

FIGS. 4(A) and 4(B) are, respectively a schematic cross sectional view and a perspective view of a heating insertion member for joining according to an eighth embodiment of the present invention. Embodiment 8 performs the joining method of the present invention. For instance, when the members to be jointed of circulator pipes are to be jointed each other, joining agents 3a, 3b are preliminarily formed at the butting surfaces of the conductive ring-shaped heating ceramics 2 thereby to unite as a heating insertion member for joining.

If the members to be jointed are φ20×φ15×100, the heating ceramics 2 is a simple ring of the size φ20×φ15×5 so as to conform to the butting surfaces of the members.

A known thin film or thick film forming technology is applicable to arrange the joining agents, for example, vacuum deposition, ion plating, sputtering, CVD, dipping, metallizing, flame spraying, etc.

The members to be jointed become easy to handle at the joining time if the insertion member as hereinabove is used.

[Embodiment 9]

FIGS. 5(A) and 5(B) are, respectively a schematic cross sectional view and a perspective view of a heating insertion member for joining according to a ninth second embodiment of the present invention. A flange is formed in each butting surface of the conductive ring-shaped heating ceramics 2 in order to fit the members to be jointed more easily. Similar to Embodiment 8, joining agents 3a, 3b are provided beforehand to unite them with the heating ceramics 2. Since the joining agents are formed in the same manner as in Embodiment 8, the description thereof will be abbreviated here.

By using the insertion member as above, positioning at the joining time is made much easier, thereby improving the joining efficiency.

[Embodiment 10]

FIG. 6 is a schematic cross sectional view of a heating insertion member for joining according to a tenth embodiment of the present invention, wherein insulating ceramics 21, 22 are provided totally in the inner and outer peripheries of the ring-shaped electroconductive ceramics 2, respectively. joining agents 3a, 3b are formed beforehand at the butting surfaces of the heating ceramics 2 and insulating ceramics 21, 22 thereby to unite joining agents with the heating ceramics. It may be also possible to form joining agents 3a, 3b at the butting surfaces of the insulating ceramics which are provided both in the inner and outer peripheries of the heating ceramics 2 and in the whole butting surfaces of the heating ceramics 2. The insulating ceramics are formed by such coating methods at the electroconductive ceramics as a thin film or thick film forming technology which is used for the formation of the joining agents in Embodiment 8 or by integral sintering simultaneously when the electroconductive ceramics are manufactured. The joining agents are provided in the same manner as in Embodiment 8, the description of which is therefore abbreviated here.

The above heating insertion member for joining is useful when the surface of the jointed part is necessary to be electrically insulating.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is claim:

1. A method for joining ceramic members comprising the steps of butting ceramic members to be joined against each other with a sintered heating ceramic member intervened therebetween, a part or the whole of said heating ceramic member having an electric conductivity larger than those of said ceramic members to be jointed, and, thereby constituting an assembled body, supplying an electric current to an induction heating coil provided in the vicinity of the butting part while pressing said assembled body in the butting direction to heat said heating ceramic member mainly by the induction heating, and heating said butting part up to a joining temperature needed for joining said ceramic members.

2. A method for joining ceramic members comprising the steps of butting ceramic members to be joined against each other with a sintering heating ceramic member intervened therebetween via joining agents, a part or the whole of said heating ceramic member having an electrical conductivity larger than those of said ceramic members to be jointed, and, thereby constituting an assembled body, supplying an electric current to an induction heating coil provided in the vicinity of the butting part while pressing said assembled body in the butting direction to heat said heating ceramic member or said heating ceramic member and said joining agents mainly by the induction heating, and heating said butting part up to a joining temperature needed for joining said ceramic members.

3. A method for joining ceramic members as claimed in claim 1 or 2 wherein a part or the whole of said assembled body is heated to temperatures lower than the joining temperature by an auxiliary heating means from before the main heating by the induction heating is started to after it is finished.

* * * * *

UNITED STATES PATENT AND TRADEMARK OFFICE
CERTIFICATE OF CORRECTION

PATENT NO. : 5,534,091

DATED : July 9, 1996

INVENTOR(S) : Kouji Okuda, et al.

It is certified that error appears in the above-identified patent and that said Letters Patent is hereby corrected as shown below:

On the Title Page, Section [56], under "FOREIGN PATENT DOCUMENTS", line 1: delete "of 0000" and insert --86--

Column 1, line 47: "are" should read --is--

Column 2, line 54: "The joining..." should start a new paragraph on line 55.

Column 3, line 21: "an" should read --a--

Column 3, line 41: "(o12x5x50)" should read -- ($\phi$12x$\phi$5x50) --

Column 4, line 10: "(o20xo5x5)" should read -- ($\phi$20x$\phi$15x5) --

Column 4, line 34: "temperatures" should read --temperature--

Column 4, line 50: "(o20x15x100)" should read --($\phi$20x$\phi$15x100) --

Column 5, line 67: "$[\Omega \cdot cm]^-$" should read --$[\Omega \cdot cm]^{-1}$--

Column 7, line 32: "SiC/c/" should read .nb --SiC/C/--

UNITED STATES PATENT AND TRADEMARK OFFICE
CERTIFICATE OF CORRECTION

PATENT NO. : 5,534,091
DATED : July 9, 1996
INVENTOR(S) : Kouji Okuda, et al.

It is certified that error appears in the above-indentified patent and that said Letters Patent is hereby corrected as shown below:

Column 10, line 1: delete "second"

Signed and Sealed this

Seventh Day of October, 1997

*Attest:*

BRUCE LEHMAN

*Attesting Officer*   *Commissioner of Patents and Trademarks*